United States Patent [19]
Ketting et al.

[11] Patent Number: 5,803,558
[45] Date of Patent: Sep. 8, 1998

[54] TRACK ROLLER FOR CRAWLER CHAIN

[75] Inventors: Michael Ketting, Ennepetal; Holger Humbek; Thorsten Slowak, both of Bochum; Frank Heyer, Wetter; Harald Becker, Oberhausen; Matthias Stauch, Ruhla; Frank Fröhner, Lengenfeld; Heiko Holzapfel, Ludwigsfelde, all of Germany

[73] Assignees: Intertractor Aktiengesellschaft, Gevelsberg; IAMT Ingenieursgesellschaft fur Allgemeine Maschinentechnik mbH, Plauen, both of Germany

[21] Appl. No.: 688,184

[22] Filed: Jul. 31, 1996

[30] Foreign Application Priority Data

Aug. 5, 1995 [DE] Germany ............ 195 28 837.8

[51] Int. Cl.⁶ ................................................ B62D 55/15
[52] U.S. Cl. ........................... 305/136; 305/119; 305/138
[58] Field of Search ....................... 305/124, 128, 305/129, 136, 137, 138, 199, 100, 119

[56] References Cited

U.S. PATENT DOCUMENTS

| | | | |
|---|---|---|---|
| 3,869,931 | 3/1975 | Boggs | 305/119 X |
| 3,945,693 | 3/1976 | Booth, Jr. et al. | 305/119 X |
| 4,152,031 | 5/1979 | Maguire | 305/119 |
| 4,209,205 | 6/1980 | Gregg et al. | 305/119 |
| 4,371,362 | 2/1983 | Dorris | 305/100 X |
| 5,553,931 | 9/1996 | Diekevers | 305/100 |

*Primary Examiner*—Russell D. Stormer
*Attorney, Agent, or Firm*—Herbert Dubno

[57] ABSTRACT

In order to create a track roller for crawler chains, consisting of a track roller body, an axle traversing the same as well as bearings and seals arranged between the track roller body and the axle, whereby the axle is affixed to a mount with its ends axially protruding from the track roller body, which has a long life when used as intended, the invention proposes that the bearings (3) radially arranged between the track roller body (1) and the axle (2) be designed as pivoting bearings, so that the load-caused bending of the track roller body or the axle can follow without jamming.

4 Claims, 9 Drawing Sheets

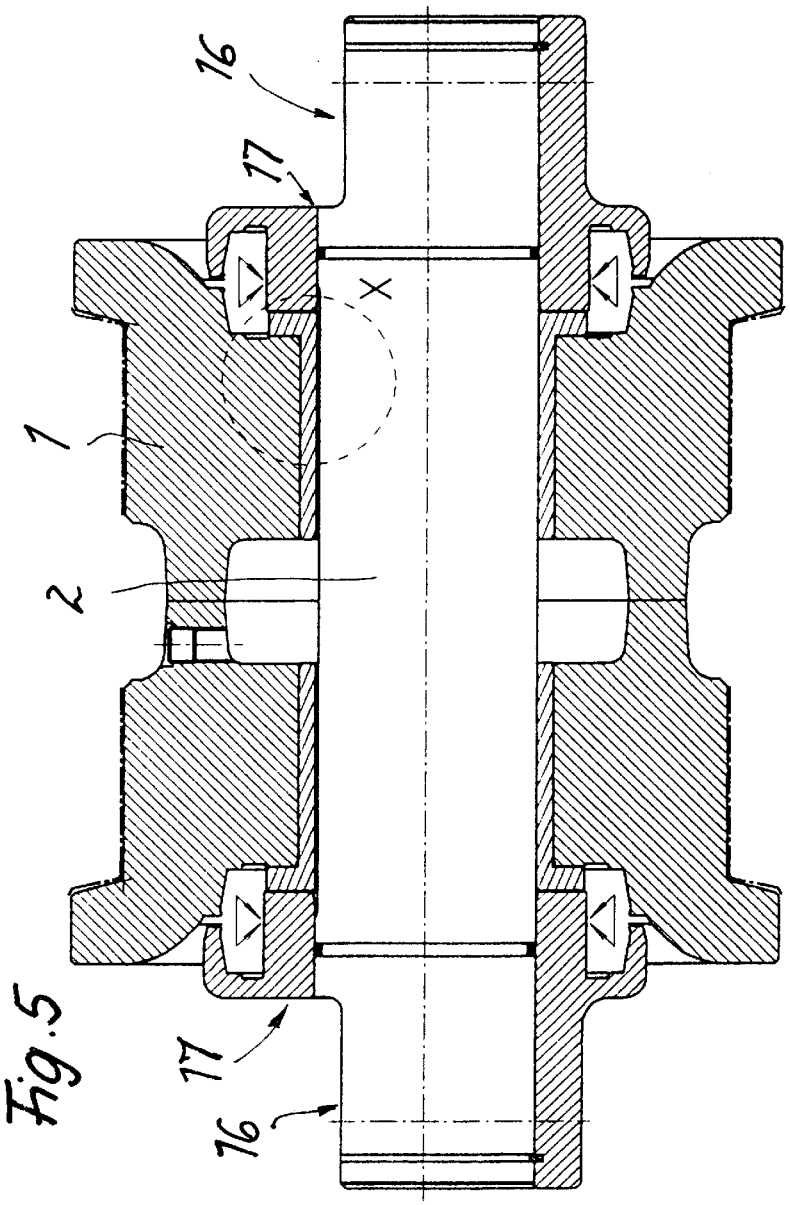
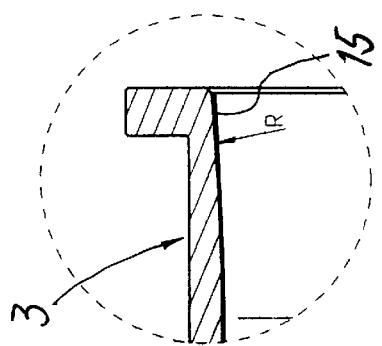
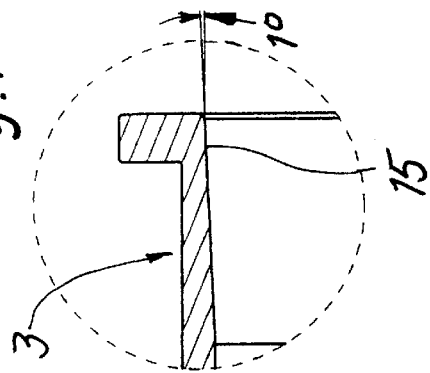

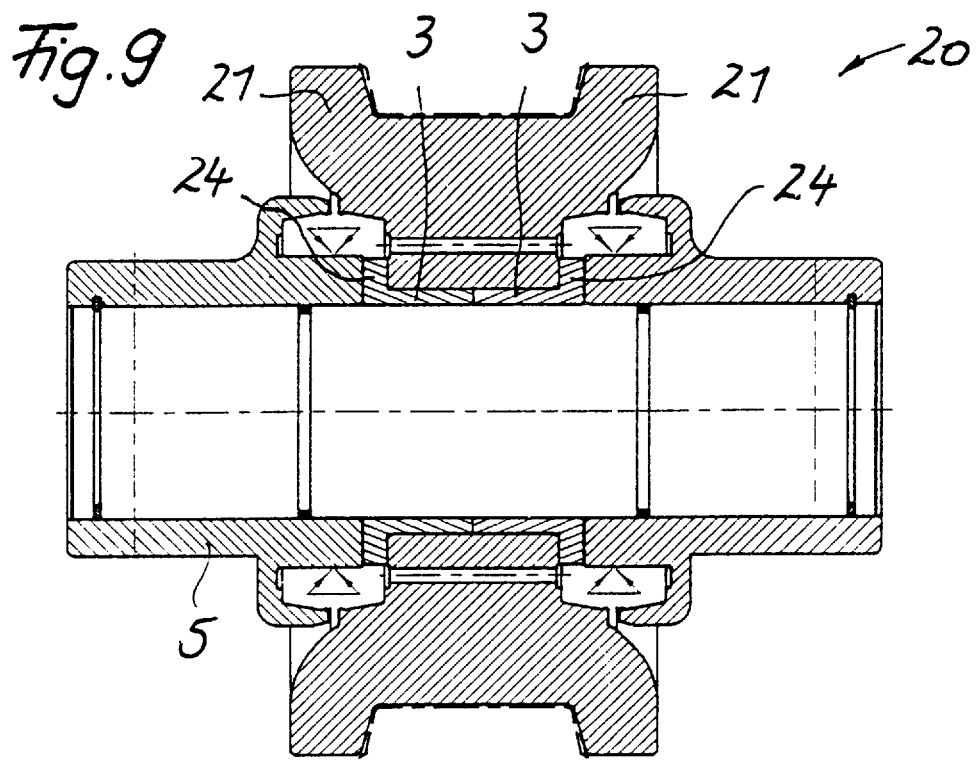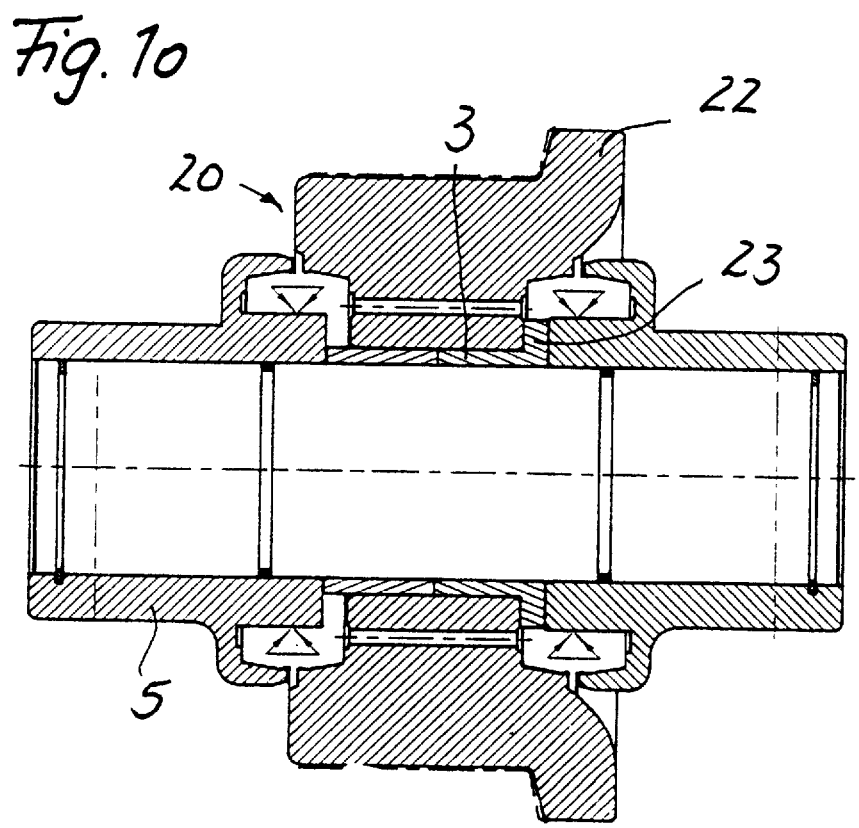

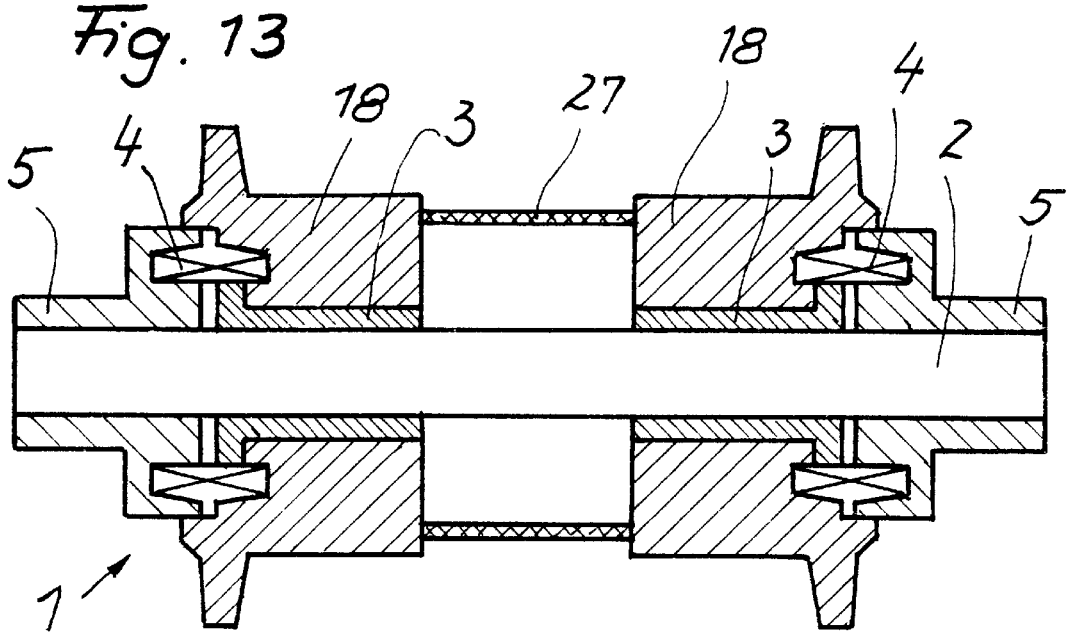
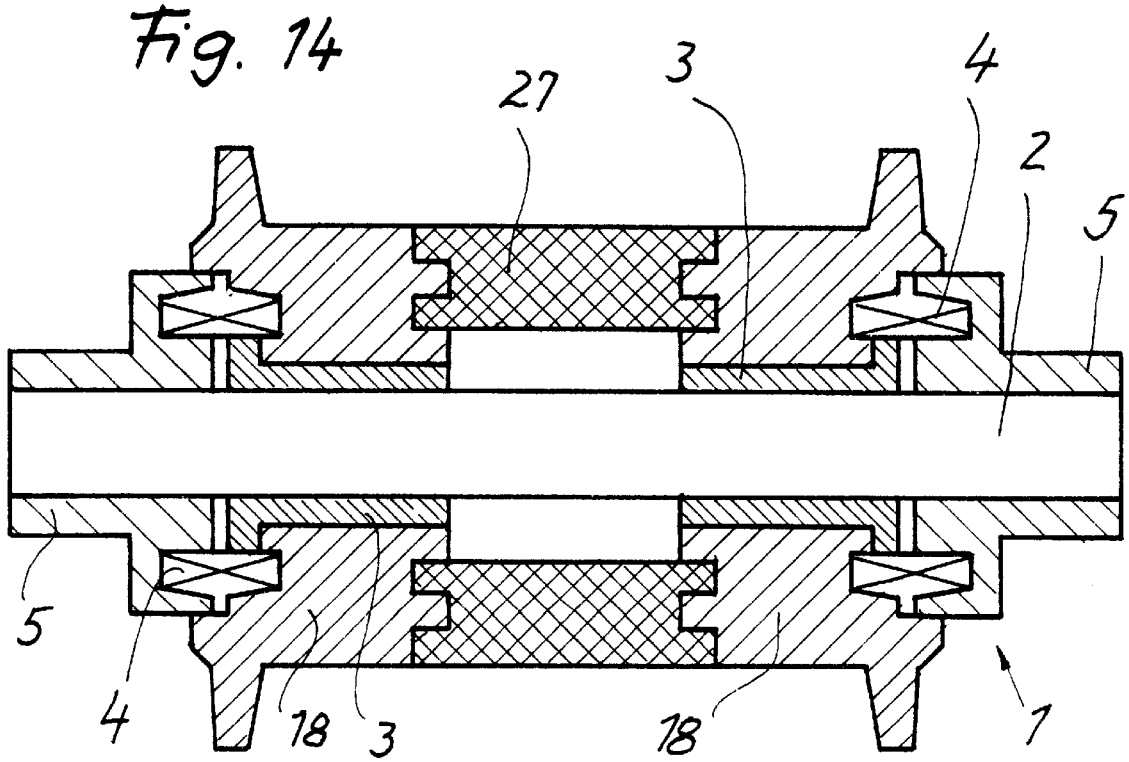

TRACK ROLLER FOR CRAWLER CHAIN

FIELD OF THE SPECIFICATION

Our present invention relates to a track roller for crawler chains or similar endless belts or chains, consisting of a track roller body, an axle traversing the same, as well as bearings and seals arranged between the track roller body and the axle, whereby the axle is supported so that it is fixed in a mount with its end projecting from the track roller body in axial direction, or it consists of a track roller body with stub shafts at its ends, which are rotatably supported in end caps rigidly fixable in a mount and provided with bearings and seals.

BACKGROUND OF THE INVENTION

Such track rollers are known for instance from DE-GM 69 24 259 and DE 37 10 104 C2.

When such track rollers are used as intended, considerable loads are generated which can lead to a bending of the axle and/or of the track roller body. The result is a high degree of wear of the bearings arranged between the track roller body and the axle or between the stub shafts and the end caps. The bearings usually designed as bearing bushings wear out very quickly at the edges, which are subjected to excessive stress, when due to deformation or tolerances, the median of the bearing bushing and the axle are not coaxial with respect to each other. In practice slight deformations occur all the time, so that the corresponding bearings are constantly subjected to uneven stresses or, are locally overstressed.

OBJECT OF THE INVENTION

It is the object of the invention to counteract the breakdown of the track rollers due to the failure of the bearings and, particularly to counteract wear, excessive load and load at the edges of the bearings.

SUMMARY OF THE INVENTION

A first solution to this problem is to provide, according to the invention, between the track roller body and the axle, or between the stub shafts and the end caps, radially arranged bearings in the form of pivoting bearings, preferably having a spherical cross section contour, so that the bending of the track roller body or the axle, due to load, occurs without jamming.

Because the bearing are pivot bearings or preferably as bearings with a spherical cross section contour, angle errors caused by the bending of the track roller body or the axle, do not lead to damage in the bearing or bearings, since the bearings can follow the corresponding motions. In the case of a spherical cross section contour, the spherical contour can be provided only on one side of the respective two bearings, which simplifies the assembly and is can be used with undivided components. The bearings are preferably arranged immediately under the running surface of the track roller body. Advantageously the hearing can consist of a first bearing part arranged on the axle or stub shaft, rotatable, nonrotatable or made in one piece therewith, or can consist of this first such bearing part and of a second bearing part arranged rotatably or nonrotatably in the track roller body or in the end caps, whereby the contact surface between the first and second bearing part is spherically shaped.

The strain on the pivoting bearings or the bearings with spherical cross section contour, does not depend on the bending of the axle, since the contact geometry does not change. For this reason the axle can also be made with a smaller diameter compared to the conventional embodiments.

The axial strain can also be absorbed due to an accentuated arched contour, whereby preferably additional axial butting faces are provided.

It is advantageous for the median axis of the line of curvature of the spherical cross section to cross the longitudinal median axis of the track roller.

For the axial positioning of the track roller body on the axle, respectively between the end caps, additional axial butting faces or bearings can be arranged at the end pieces or the end caps or at the frontal end surfaces of the track roller body.

Alternatively the bearing arranged between the track roller body and the axle or between the stub shafts and end cap can be a slide bearing bushing, which is widened in a tapered manner or like a cone, in the area where the highest strain occurs during the bending of the track roller body or of the axle, so that in a strain-free state a corresponding gap is formed between the end area of the slide bearing bushing and the axle or the stub shaft.

It is preferable that the widening be achieved via a small radius or a small chamfer of for instance 1°.

The end of the axle can be flattened on one side or polygonally shaped and can be insertable into a recess accommodating its shape, on the mount side, whereby the step resulting from the flattening of the polygonal shape serves as a contact surface on the mount side.

In addition, the axle ends can have transverse holes and that the fastening on the mount side can be achieved via fastening means, particularly screws, passing through these transverse holes.

In the aforedescribed embodiment the bearing bushing is tapered in the area of maximum strain, which means that via a radius or a chamfer the slide surface of the bushing is adapted to the bending line of the axle or the shaft. In this area the bearing is elastic to a certain extent, so that a deformation of the axle or the shaft is possible without causing extreme strain at the edges of the bushing in the bearing. A load reduction is achieved in the area subjected to maximum load.

Due to the flattening of the polygonal design of the axle ends the conventional dowel pins can be eliminated as a securing means against rotation, so that the corresponding end piece is simplified. Due to the contact surface of the axle in the area of the flattening of the polygonal shape, a supporting of the mount is possible, so that an angular deviation of the axis due to tolerances can be minimized. It is also possible to have a screw connection, and thereby a fastening of the axle directly to the mount frame by means of the transverse holes and the screws inserted therein, so that a conventional end piece is completely eliminated. In such an embodiment only a lid with a seal is required, or the corresponding seal can be integrated into the axle. Also this way a minimization of the tolerances is insured, which is advantageous for the smooth operation of the track roller.

In a further alternative the track roller body supported on the axle is made of two parts, which are arranged at an axial distance from each other, while the axle has a support affixed to the mount in the middle part located between the two partial bodies, or the partial bodies are arranged coaxially and are connected to each other by an elastic bridge, e.g. metallic bellows or an elastomer or rubber element.

The bearing elements can then be slide bearings placed between the partial bodies and the axle.

Both partial bodies can be equipped with seals at both axial ends, which are arranged between the frontal surfaces of the partial bodies and the frontal surfaces of the middle support fastened to the mount, or the end pieces affixed to the mount. In this embodiment the track roller body is no longer made in one piece, but consists of two symmetrical, preferably equal, half-bodies. The partial bodies of the roller formed in this way are preferably supported on the axle via slide bearings. The fastening to the mount is achieved by end pieces, in which the axle stubs are held, as well as by; a middle support, wherein the axle is also held. In an embodiment wherein the track roller body is rotatably supported in the end caps by means of its stub shafts, this two-part design of the track roller can also be used, whereby then in the middle area between the two partial bodies an additional support point fastened to the mount is formed. In principle each of the partial bearing bodies can have stub shafts at both frontal sides, which are rotatably supported in corresponding end caps or in one median cap. Due to this construction, an additional support is afforded in the middle of the track roller, whereby in the middle of this separation area additional sealing elements are required. Due to the three support points formed this way, the load is distributed. The short lever arms lead to few deformations and shorter bending moments. The axle, the end pieces, the track roller body, the screw connections and the bearing are then subjected to less strain.

When an elastic bridge is provided between the partial bodies of the track roller, the bridge can be a tubular metallic bellows linkage or a tube-like elastomer or rubber linkage fastened to the partial bodies.

In a further alternative the track roller body provided at its ends with stub shafts is divided in the middle and provided with stub shafts, whereby the middle stub shafts are rotatably supported in a middle double cap which is fastened to the mount.

In yet another alternative for each chain side separate partial track rollers are provided, whereby the partial track rollers of one chain side have a lateral distance from the partial track rollers of the other chair side and the partial track rollers of one chain side are either coaxial to the partial track rollers of the other chain side, or they are axially parallel to each other staggered in the running direction of the chain.

Thereby it is advantageous to provide each partial track roller with two wheel flanges and the bearings with two stopping faces for the absorption of the axial forces of the partial track roller.

Alternately each partial track roller can also be provided with only one wheel flange, and correspondingly the bearing only with one stopping face for the absorption of axial forces.

In these embodiments each track roller body has only one running face for one chain side. The corresponding partial track rollers have therefore to be arranged next to each other (coaxially to each other) or also staggered in the running direction, whereby they are arranged along the track edges of a chain or the like, on the right side or the left side of the chain.

Since each partial track body has two wheel flanges, the corresponding slide bearing has two corresponding stopping faces, in order to support the axial forces. When only one wheel flange is provided at each partial track roller, the axial forces occur only in one direction, so that one axial bearing surface is sufficient. Due to the short construction of the axle, deformations and bending moments are reduced. The strain on axles, end pieces, screws and slide bearings are thereby considerably reduced.

In a further alternative the axle consists of two axle stubs frontally engaging in the track roller body. The fastening means for mounting of each axle stub can be made in one piece with the axle stub.

In addition the seat for the frontal seal between the axle stub and the track roller body be worked into the flange border of the axle stub.

Under certain circumstances it is preferable to design the bearing between axle stub and track roller body as a cone bearing with cone angles diverging towards the end of the track roller body on the corresponding axle stub.

In this embodiment the track roller body is connected with the axle stub via slide bearing bushings. Due to the relatively large axle stubs, the surface for the screw connection for fastening to the mount can be provided directly on the axle body. Besides also a conical bearing surface can be provided. Due to the division of the axle the entire system becomes more yielding, and a certain adjustment mobility in the bearing area results. The strains at the screw connection surfaces fastened to the mount increase, since the bending moments have to be additionally supported. Due to the screw connection surface directly on the axle fewer tolerances are applied, whereby the angular imperfections can be reduced in the bearing.

BRIEF DESCRIPTION OF THE DRAWING

The above and other objects, features, and advantages will become more readily apparent from the following description, reference being made to the accompanying drawing in which:

FIG. 5 shows a further embodiment shown in a median longitudinal section;

FIGS. 6 and 7 are details of a device similar to that of FIG. 5 on a larger scale showing alternatives.

FIGS. 9 and 10 are sections of further embodiments

FIGS. 13 and 14 are sectional views of further variants

SPECIFIC DESCRIPTION

Figure 1:
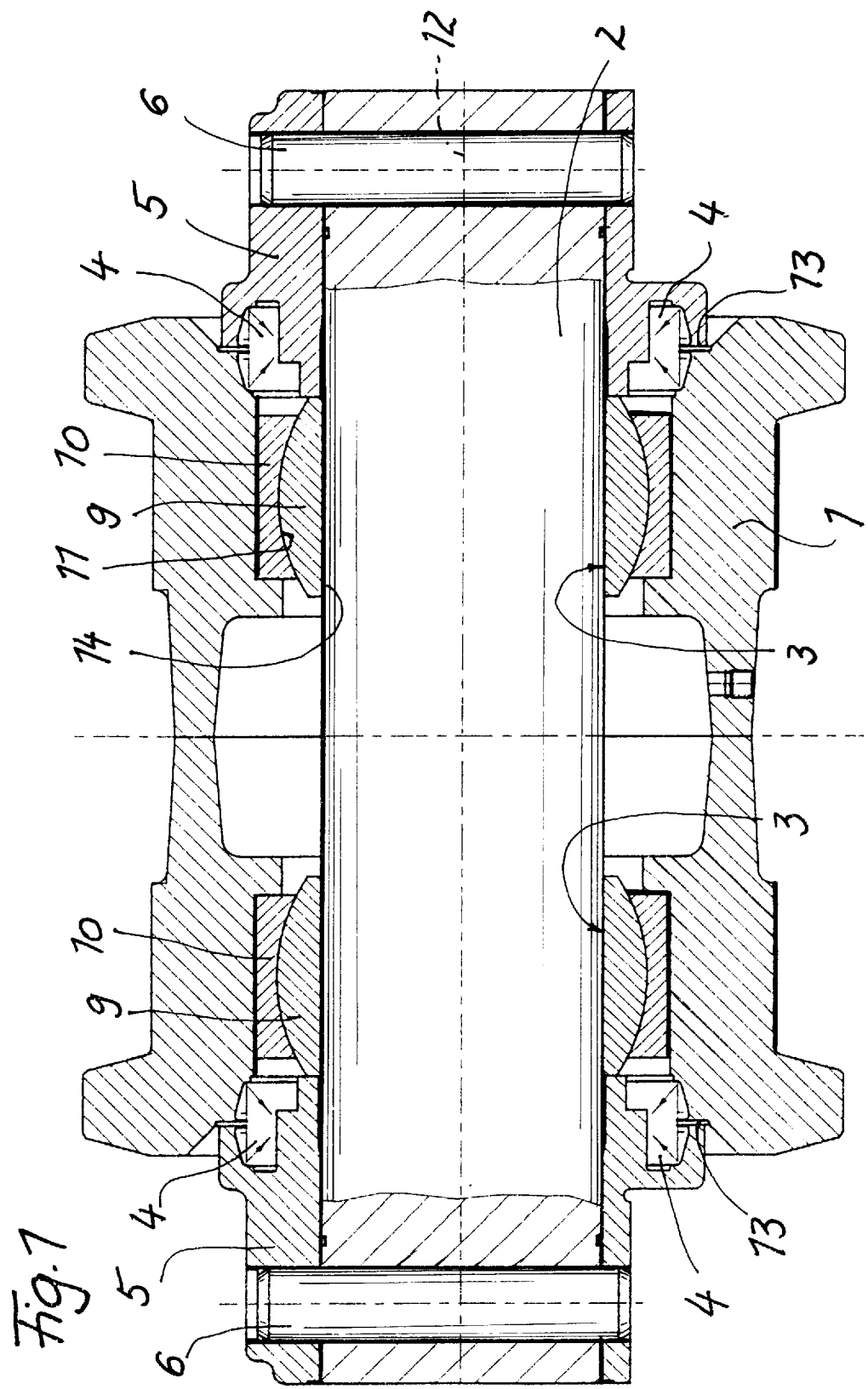
FIG. 1 shows a first embodiment of a track roller in a median longitudinal section.

In FIG. 1 a track roller for crawler chains or similar endless belts or chains is shown. It consists of a track roller body 1, an axle 2 traversing the same, as well as bearings 3 and seals 4 arranged between the track roller body 1 and the axle. On the ends of axle 2, axially protruding from the track roller body 1, end pieces 5 are fastened and connected to dowel pins 6 which are rigidly fastened to parts of the chassis or the like. Such a track roller is shown in FIGS. 1, 3, 5, 8 and in principle also in the FIGS. 11 and 12.

Figure 2:
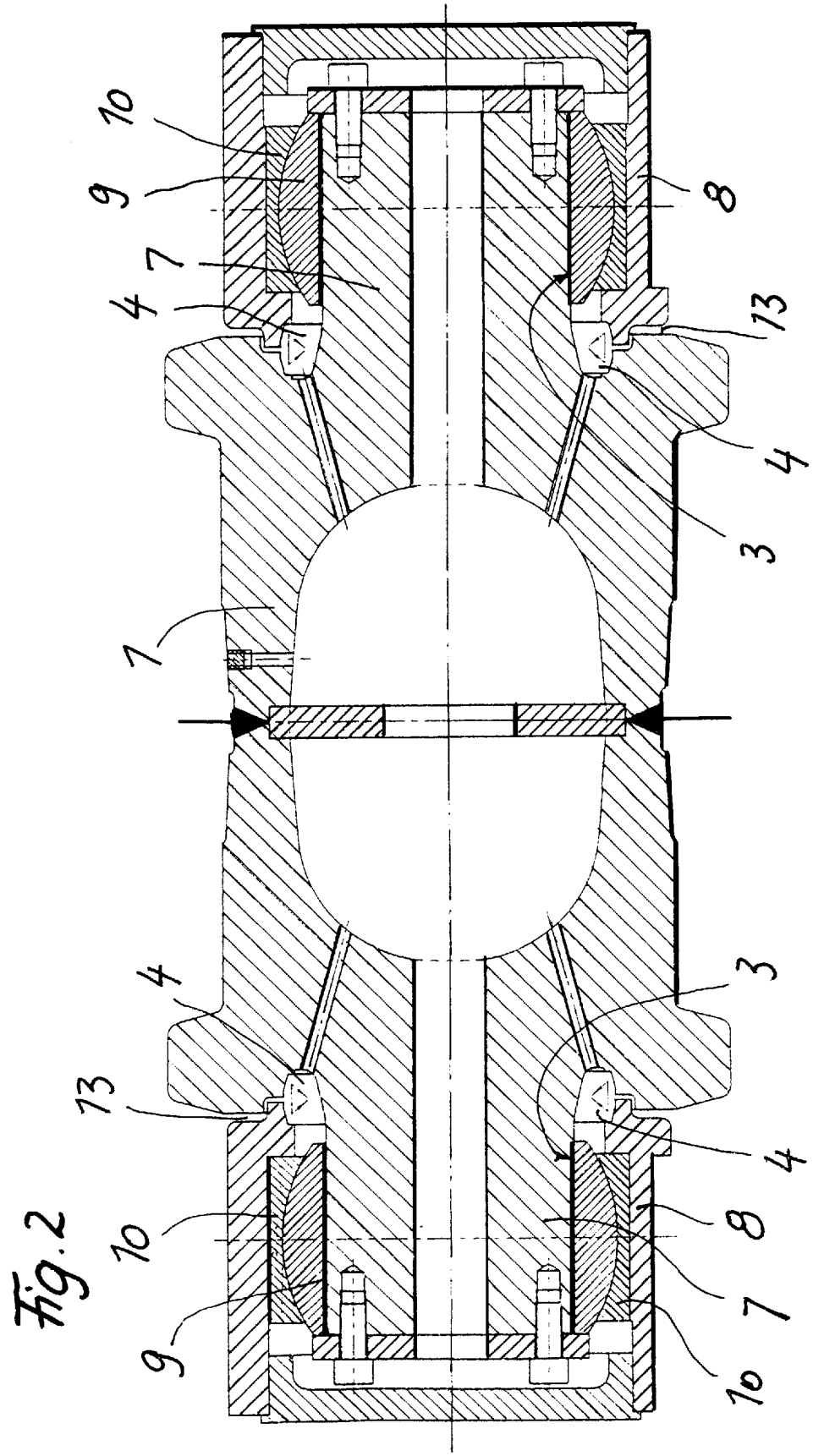
FIG. 2 is an axial section of a variant of the track roller

The embodiment according to FIG. 2 shows a track roller which consists of a track roller body I which at its ends has stub shafts 7. The stub shafts 7 are rotatably supported in end caps 8 provided with corresponding bearings 3 and seals 4.

In the embodiments according to FIGS. 1 and 2, the bearings arranged radially between the track roller body 1 and axle 2 or between the stub shaft 7 and end caps 8, are designed as pivoting bearings, particularly as bearings with a spherical cross section contour. Based on this design, the load-caused bending of the track roller body 1 or of the axle 2, can follow without jamming. The bearings 3 can consist of a first bearing part 9 arranged on the axle 2 or the stub shaft 7, rotatable, nonrotatable or made in one piece therewith or made of this first such bearing part, and of a second bearing part 10 arranged rotatably or nonrotatably in the track roller body 1 or in the end caps 8, whereby the contact surface 11 between the first and second bearing parts 9, 10 is spherically shaped in cross section. Thereby the median axis of the curvature line of the spherical cross section traverses the longitudinal median axis 12 of the track roller.

For the axial positioning of the track roller body 1 on the axle 2 or between the end caps 8, additional axial butting faces or bearings 13 can be provided. As made clear by the embodiment shown in FIG. 1, the track roller body can either rotate about the surface 14, so that the surface 11 serves only for swinging, or else the rotation and the swinging motion can take place in the area of the arched surface 11. In this case the part 9 can also be made in one piece with the axle 2. The axial strains can be absorbed by a correspondingly designed, strongly arched contour (at 11). It is also possible to provide the first and second bearing part 9, 10 only semilaterally with a corresponding rounding (spherical contour 11), whereby this rounding ends on the side facing the other bearing 9, parallel to the median longitudinal axis of the roller. This can simplify the assembly.

Figure 3:
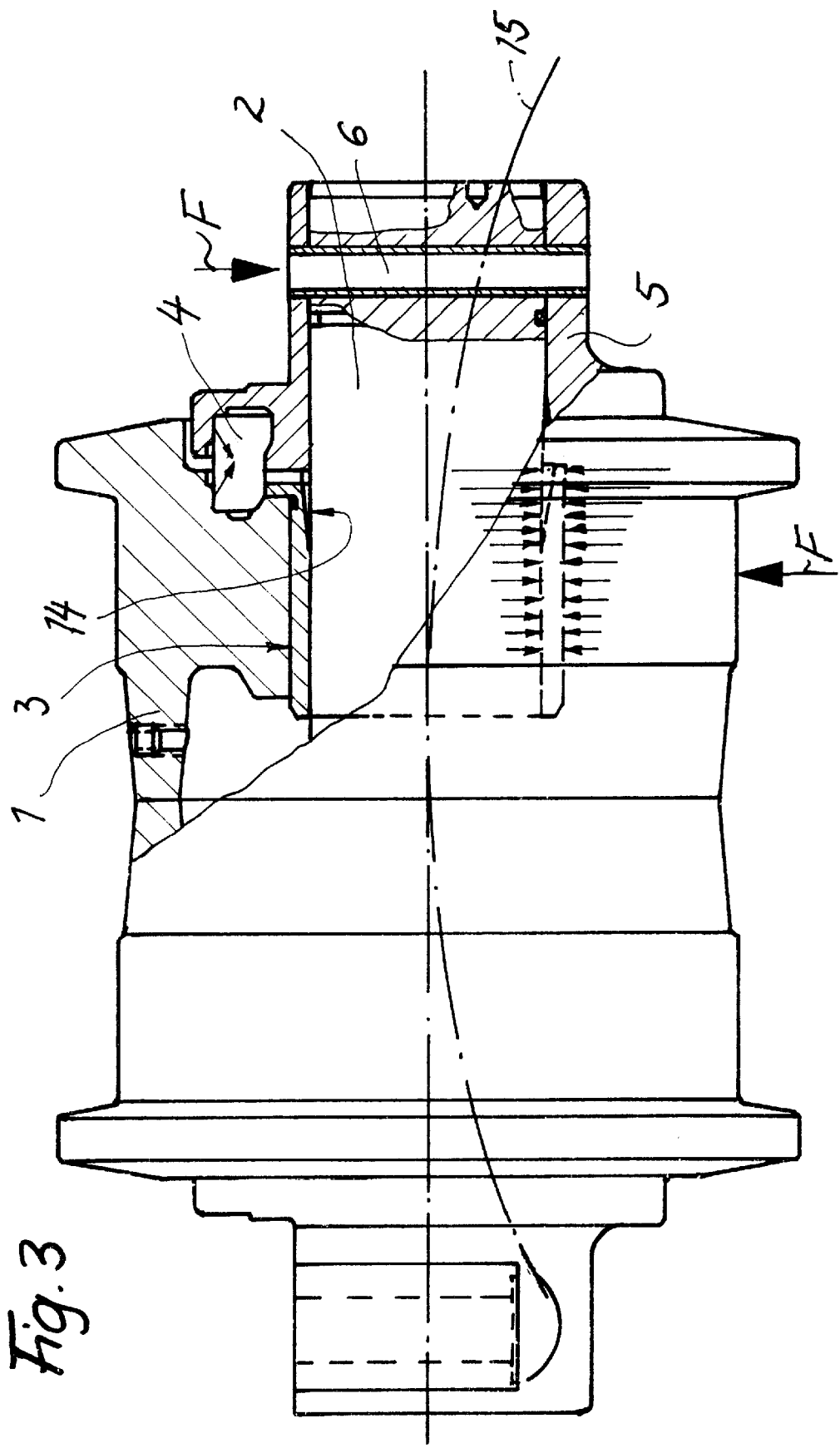
FIG. 3 is an axial section of a further variant in the same view, partially sectioned; a further variant in the same view, partially sectioned.

In the embodiment of FIG. 3, between the track roller body 1 and the axle 2, a slide bearing bushing is provided as bearing 3. In the area where the highest strain is exerted during the bending of the track roller body 1, respectively the axle 2, the bushing is widened in tapered or conical manner, so that in a load-free state a corresponding gap 14 is formed between the outwards oriented end area of the slide bearing bushing and the axle 2. The occurrence of the forces is indicated by arrows F and the small arrows in the lower half of the drawing. The bending line is indicated at 15.

Figure 4:
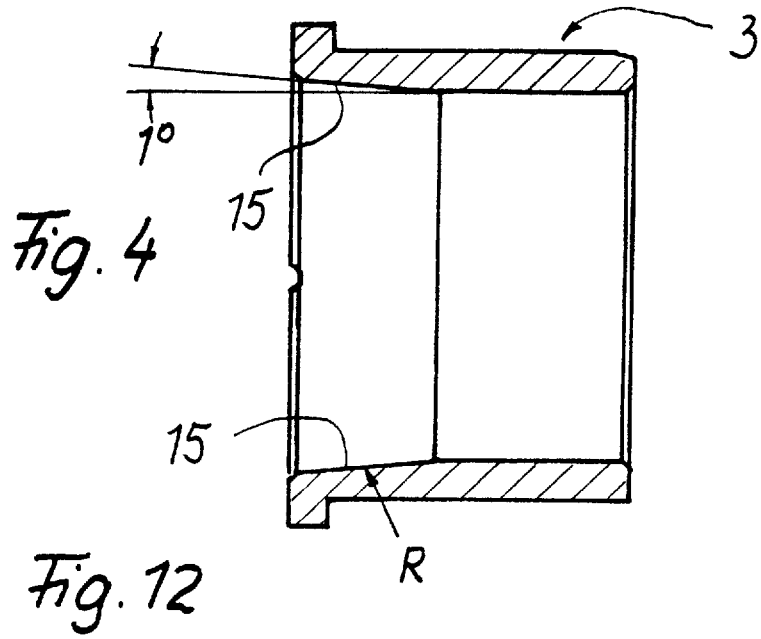
FIG. 4 is a detail of FIG. 3 on a larger scale.

As can be seen especially from FIG. 4, the widening 15 is achieved by a small radius R or by a small chamfer of for instance one degree.

In the construction according to FIG. 5 the configuration is similar, whereby there the ends of the axle 2 are flattened. The flattening is made clear at 16. This way it becomes possible to insert the axle ends in a shape-fitting recess on the mount side, whereby the step 17 created by the flattening 16 serves as a contact surface.

As a result of the fact that in these embodiments the bearing bushing of bearing 3 is tapered in the area of maximum strain, which means that via a radius or chamfer the sliding surface of the bushing is adapted to a bending line comparable to the bending line 15, a certain play is achieved, so that a deformation of the axle 2 is possible without extreme strain at the edges of the bearing. The location subjected to the highest strain is thereby relieved. Due to the flattening 16 the heretofore-used dowel pin 6 is eliminated as a means for securing against rotation and the construction of the end piece is simplified. Due to the contact surface 17 on the frame or mount, the inclined position of the axle 2 resulting from tolerances is minimized.

Figure 8:
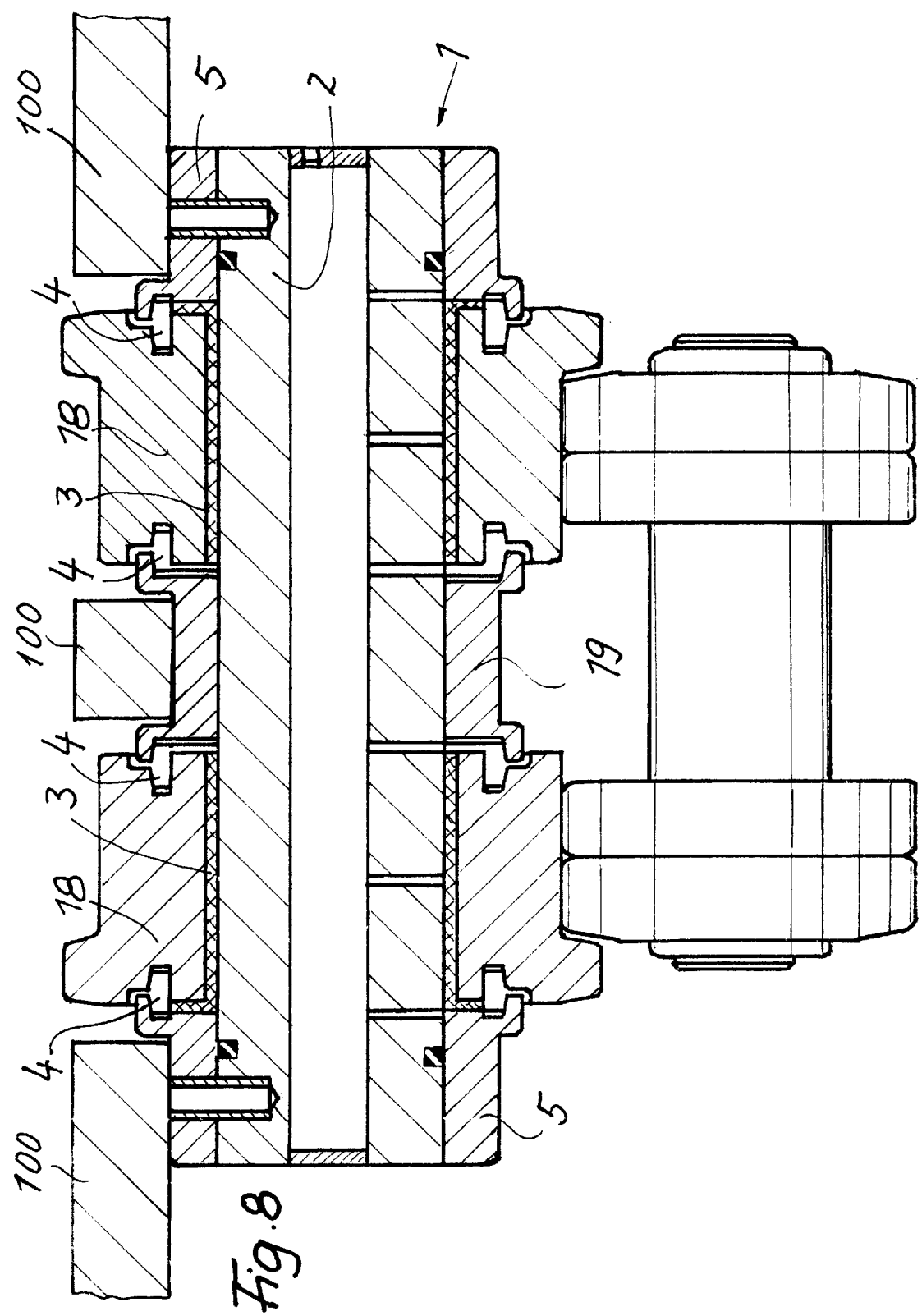
FIG. 8 shows a further embodiment of a track roller seen in median longitudinal section.

In the embodiment according to FIG. 8 the track roller body 1 supported on the axle 2 consists of two partial bodies 18, arranged at an axial distance from each other. In the middle of the gap created between the partial bodies 18, the axle 2 has a support 19 affixed to the mount. Thereby as bearing elements 3 slide bearings are arranged between the partial bodies 18 and the axle 2. Both partial bodies 18 are equipped at both axial ends with seals 4, which are arranged between the frontal faces of the partial bodies 18 and the frontal faces of the middle support 19, respectively the e n d pieces 5. Due to the three support points fixed to the mount 100 created this way the load is divided. The short lever arms lead on the one hand to reduced deformations and on the other hand to shorter bending moments. As a result the corresponding elements are less subjected to strain.

In the embodiment according to FIG. 13 and 14, between the partial bodies 18 a tubular metallic bellow linkage (FIG. 13) or a tube-shaped elastomer or rubber element is fastened, so that the load-conditioned bending deformation can be absorbed without damage.

In the embodiment according to FIG. 9 and 10, for each chain side (right and left seen in running direction) a separate partial track roller 20 is arranged. The partial track rollers of the one chain side are arranged at a lateral distance from the partial track rollers 20 of the respective other chain side. The partial track rollers 20 of the one chain side are arranged either coaxially to the partial track rollers of the of the other chain side, or else they can also be staggered with respect to each other in the running direction of the chain, axially parallel to each other.

In the embodiment according to FIG. 9, the partial track roller 20 has two wheel flanges 21. The bearings 3 have two stopping faces 24 for the absorption of the axial forces of the partial track rollers 20.

In the partial track roller 20 according to FIG. 10 only one wheel flange 22 is provided. The corresponding bearing 3 has therefore only one stopping face 23 for the absorption of the axial forces. The partial track rollers again consist of a roller body traversed by an axle, whereby between the axle and the roller body the bearing 3 is arranged. In these embodiments according to FIGS. 9 and 10, the partial track roller bodies 20 have only one running surface for one chain side. Therefore the rollers have to be arranged next to each other (coaxially) of staggered with respect to each other in the running direction (axially parallel). Due to the short construction of the axle the deformations and bending moments are reduced. The strain on the axle, end pieces, screws and slide bearing is thereby lower.

Figure 12:
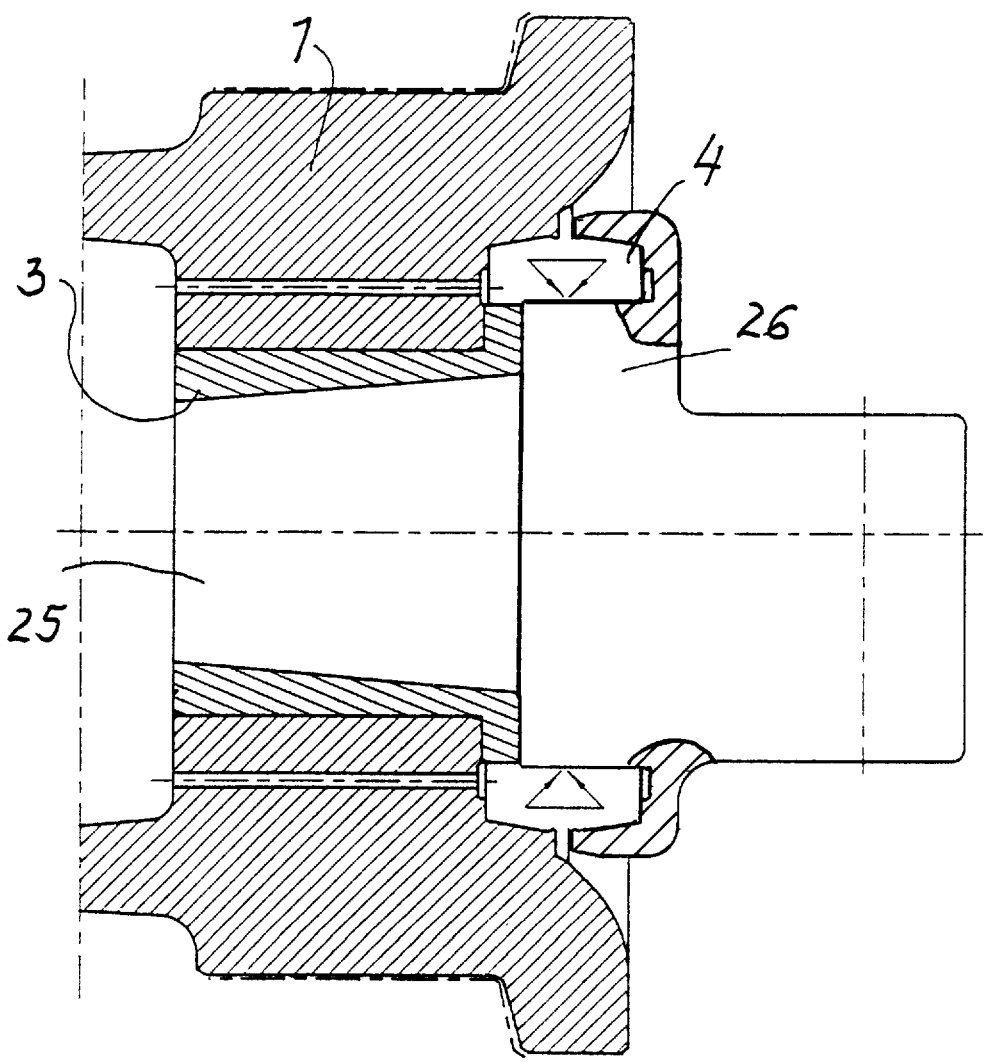
FIG. 12 is a partial axial section of FIG. 11.
Figure 11A:
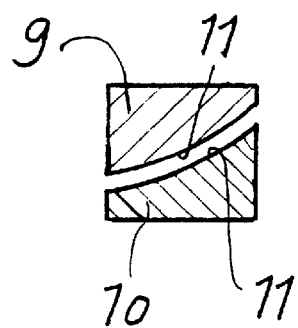
FIGS. 11 and 11a are sections of a further variant
Figure 11:
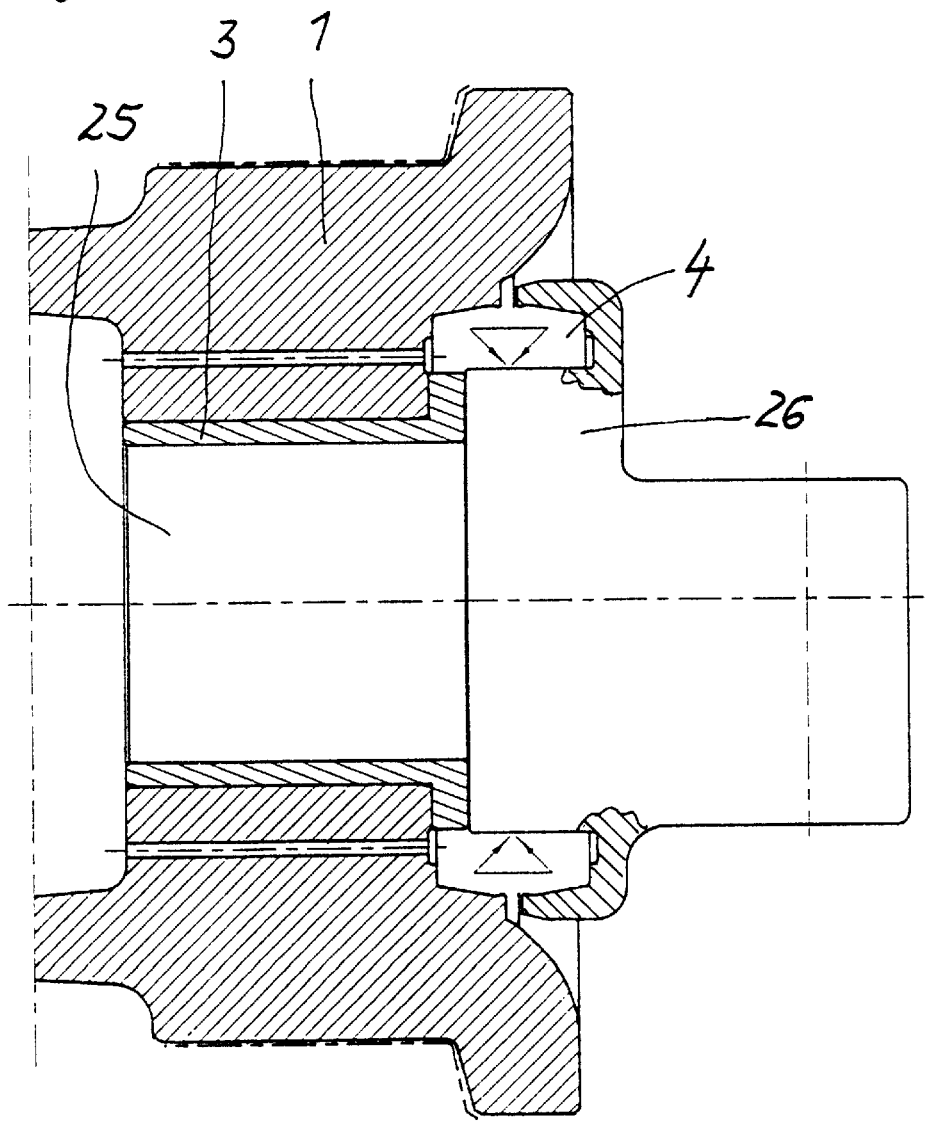

In the variant according to FIG. 11 and 12, the axle consists of axle stubs 25 each engaging on the frontal side of the track roller body 1. The means for fastening each axle stub 25 to the mount are made in one piece with the stub shafts.

The seat for the frontal seal 4 is worked in between a flange collar 26 of the axle stub 25 and the track roller body, mainly in the flange border 26. According to the embodiment of FIG. 12, the bearing 3 between the axle stub 25 and the track roller body 1 is designed as a cone bearing with angles diverging towards the end of the track roller body. Due to the relatively large axle stub 25, the surface for the screw connection and the seat for the sealing 4 can be provided directly on the free end of the axle body. By dividing the axle the entire system becomes more yielding and a certain adjustment mobility results in the area of the bearing 4 [sic]. The loads at the screw connection (connection fastened to the mount) increase, since additional bending moments have to be supported. When the surface for the screw connection is located directly on the end of the axle stubs 25 fewer tolerances are superposed, whereby angular imperfections are reduced.

In this embodiment the end piece can be in some manner made in one piece with the axle stub, so that the assembly operations are fewer. The sealing between axle and end piece can also be eliminated. Additionally the corresponding dowel pin can be eliminated. The axle body can also be made of cast iron. However during transport the rollers have to be protected as separate components in assembled stage against falling on each other. The fastening of the rollers to the frame can again be achieved by means of a central screw inserted transversely to the roller axis.

All the embodiments insure that the track roller can be subjected to increased loads and that its life is extended.

The invention is not limited to the embodiment examples, but is multiply variable within the framework of the disclosure.

All novel individual and combined features, disclosed in the specification and/or the drawing, are considered an essential part of the invention.

We claim:

1. A track roller for crawler chains, comprising:

means forming an axle;

respective end pieces mounted on said axle and supporting at opposite ends thereof, each of said end pieces having an inwardly turned face;

a track roller body subdivided into two axially spaced annular roller body members on said axle, each of said annular roller body members being disposed adjacent one of said end pieces and having an outwardly turned face juxtaposed with a respective one of said inwardly turned faces;

respective bearings between each of said annular roller body members and said axle;

a middle axle support affixed to said axle between said annular roller body members and between said bearings, said middle axle support having opposite support faces juxtaposed with other faces of said annular roller body members adjacent said middle support; and respective seals between each of said inwardly turned faces of said end pieces and the respective outwardly turned face of a respective annular roller body member adjacent thereto, and respective seals between each of said support faces of said middle support and the respective other face of the respective annular roller body member adjacent thereto, said axle extending continuously through said end pieces, said annular roller body members, and said middle axle support.

2. The track roller defined in claim 1 wherein each of said bearings is a slide bearing.

3. The track roller defined in claim 1 wherein said axle has ends provided with transverse holes receiving fasteners for anchoring said axle.

4. The track roller defined in claim 1 wherein each of said annular roller body members has a respective wheel flange.

* * * * *